J. DEEBLE.
Spring Bolt and Clip.

No. 99,413.  Patented Feb. 1, 1870.

WITNESSES:

INVENTOR:

United States Patent Office.

JOHN DEEBLE, OF PLANTSVILLE, CONNECTICUT.

Letters Patent No. 99,413, dated February 1, 1870.

IMPROVEMENT IN SPRING-BOLT AND CLIP.

The Schedule referred to in these Letters Patent and making part of the same.

To all whom it may concern:

Be it known that I, JOHN DEEBLE, of Plantsville, in the county of Hartford, and in the State of Connecticut, have invented certain new and useful Improvements in Spring-Bolts and Clips for Carriages; and do hereby declare that the following is a full, clear, and exact description thereof, reference being had to the accompanying drawings, forming a part of this specification, in which—

Letters of like name and kind refer to like parts in each of the figures.

Figure 1:
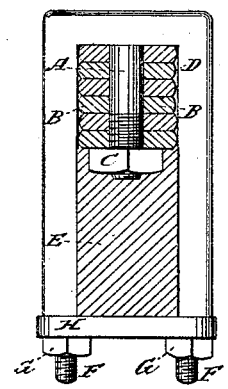
Figure 1 is a vertical central cross-section of an axle and spring, showing my device in place.
Figure 2:
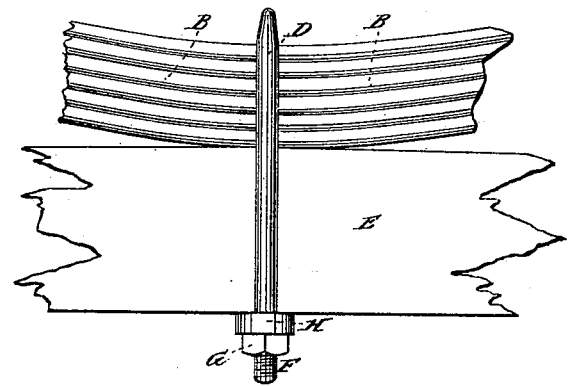
Figure 2 is a front elevation of the same.

My invention is designed to furnish a compact, efficient, and tasteful means for connecting together the leaves of the lower half of a carriage-spring, and for securing said spring to and upon the axle; and to this end, It consists in combining a spring-bolt with a clip, in the manner and for the purpose hereinafter specified.

As ordinarily constructed, the leaves of a spring are secured together and held in place, laterally, by means of one or more bolts passing through the same, at or near their centres, lengthwise, after which the spring is attached to the axle, by means of clips passing around both spring and axle, or by extending the spring-bolts downward through the latter.

In my device the spring-bolt A has a length sufficient only to allow it to be extended downward through the spring B, and receive a nut, C, upon its lower end, while the head D extends, laterally, to each side of said spring, and from thence downward beside the same and the axle E, in the form of a clip, the lower ends of which are rounded, and each provided with a screw-thread, F, and nut, G.

A clamp, H, placed over the bolts upon the lower end of the clip, so as to bear against the under side of the axle, completes the device, by means of which the leaves of the spring and the spring and axle may be firmly secured together.

The advantages obtained by the use of this device are, increased strength and durability of parts, without material increase of cost, and also an improvement in the general appearance of the spring and axle.

Having thus fully set forth the nature and merits of my invention,

What I claim as new, and desire to secure by Letters Patent, is—

The hereinbefore-described spring-bolt and clip, substantially as and for the purpose shown.

In testimony that I claim the foregoing, I have hereunto set my hand, this 5th day of January, 1870.

JOHN DEEBLE.

Witnesses:
H. R. BRADLEY,
A. B. VANDEMARK.